(12) United States Patent
Martel

(10) Patent No.: US 7,734,112 B1
(45) Date of Patent: Jun. 8, 2010

(54) METHOD AND SYSTEM FOR IDENTIFYING AN OBJECT IN AN ELECTRONICALLY ACQUIRED IMAGE

(75) Inventor: Thomas Martel, Manlius, NY (US)

(73) Assignee: VY Corporation, Wayne, PA (US)

( * ) Notice: Subject to any disclaimer, the term of this patent is extended or adjusted under 35 U.S.C. 154(b) by 780 days.

(21) Appl. No.: 11/637,634

(22) Filed: Dec. 12, 2006

Related U.S. Application Data

(60) Provisional application No. 60/749,660, filed on Dec. 12, 2005.

(51) Int. Cl.
G06K 9/40 (2006.01)
(52) U.S. Cl. ........................ 382/266; 382/199
(58) Field of Classification Search ............... 382/199, 382/266
See application file for complete search history.

(56) References Cited

U.S. PATENT DOCUMENTS

| | | | |
|---|---|---|---|
| 6,154,565 A * | 11/2000 | Johnson et al. | 382/187 |
| 6,175,659 B1 * | 1/2001 | Huang | 382/266 |
| 6,775,031 B1 * | 8/2004 | Fujiwara | 358/2.1 |
| 7,133,559 B2 * | 11/2006 | Yamazaki | 382/199 |
| 7,149,354 B2 * | 12/2006 | Bovyrin | 382/199 |
| 7,292,256 B2 * | 11/2007 | Lawther et al. | 345/629 |
| 7,425,955 B2 * | 9/2008 | Long et al. | 345/421 |

\* cited by examiner

*Primary Examiner*—Tom Y Lu
(74) *Attorney, Agent, or Firm*—Connolly Bove Lodge & Hutz LLP; Arlene P. Neal

(57) ABSTRACT

A system and method for identifying an object in an electronically acquired image that includes at least one two-dimensional array of pixels. A plurality of one-dimensional gradient runs oriented along a common direction in the two-dimensional array of pixels is identified. A second-order set of gradient runs is formed by selecting a group of previously identified one-dimensional gradient runs. Each of the one-dimensional gradient runs in the group has a pixel that is offset along an axis perpendicular to the common direction from a pixel in a neighboring one-dimensional gradient run in the group. The object is identified in the array using the second-order set of gradient runs.

14 Claims, 23 Drawing Sheets

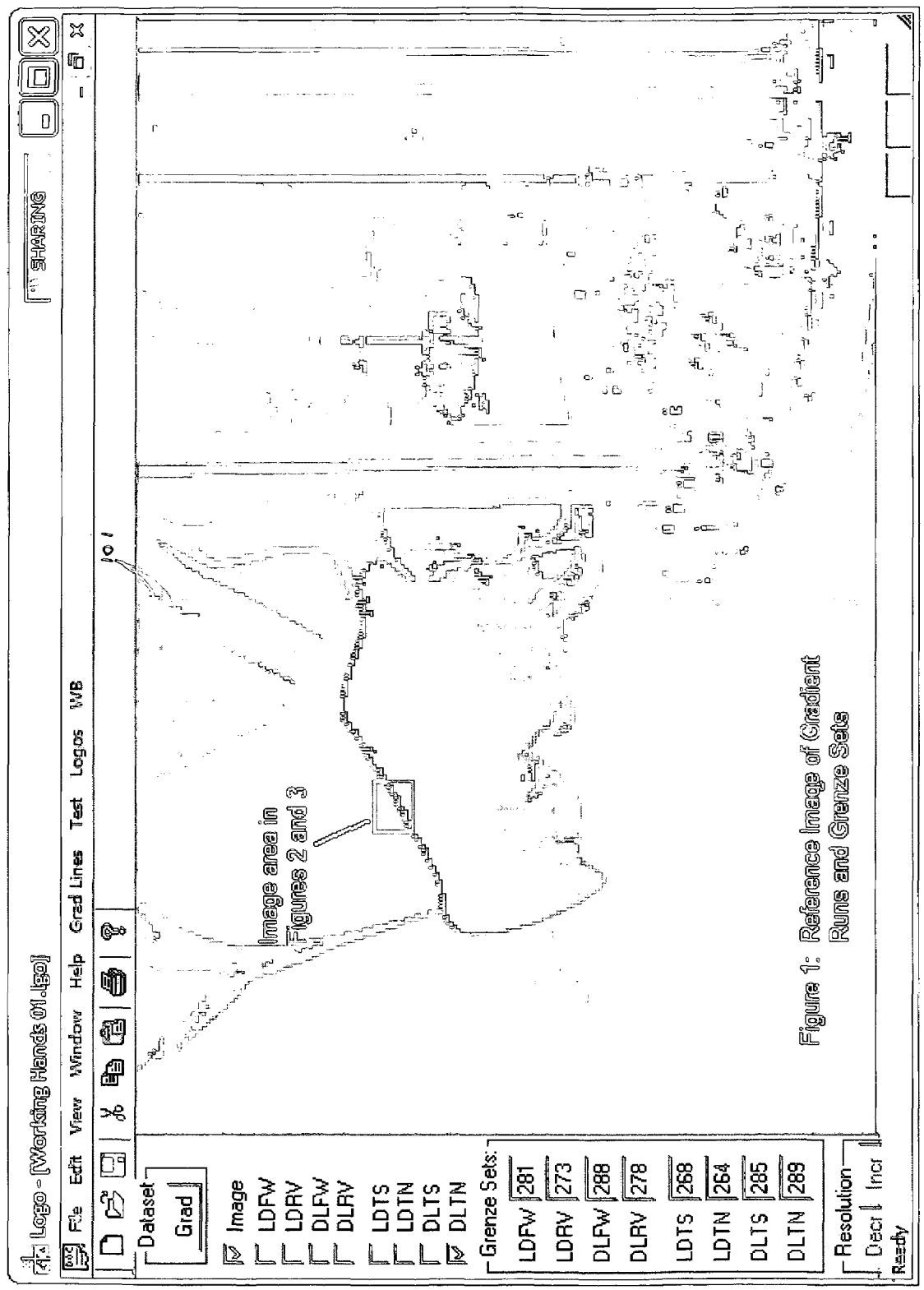

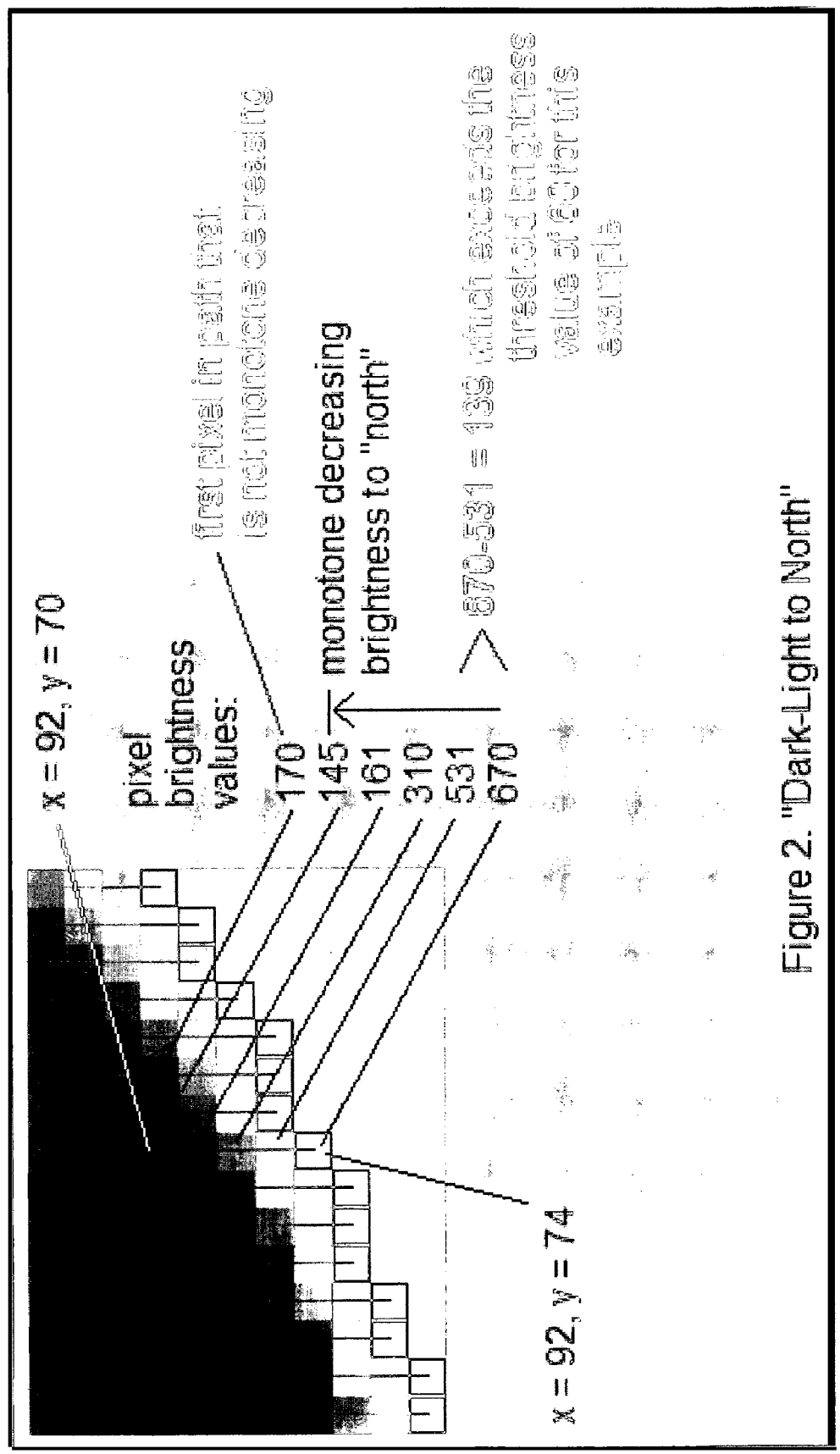
Figure 2. "Dark-Light to North"

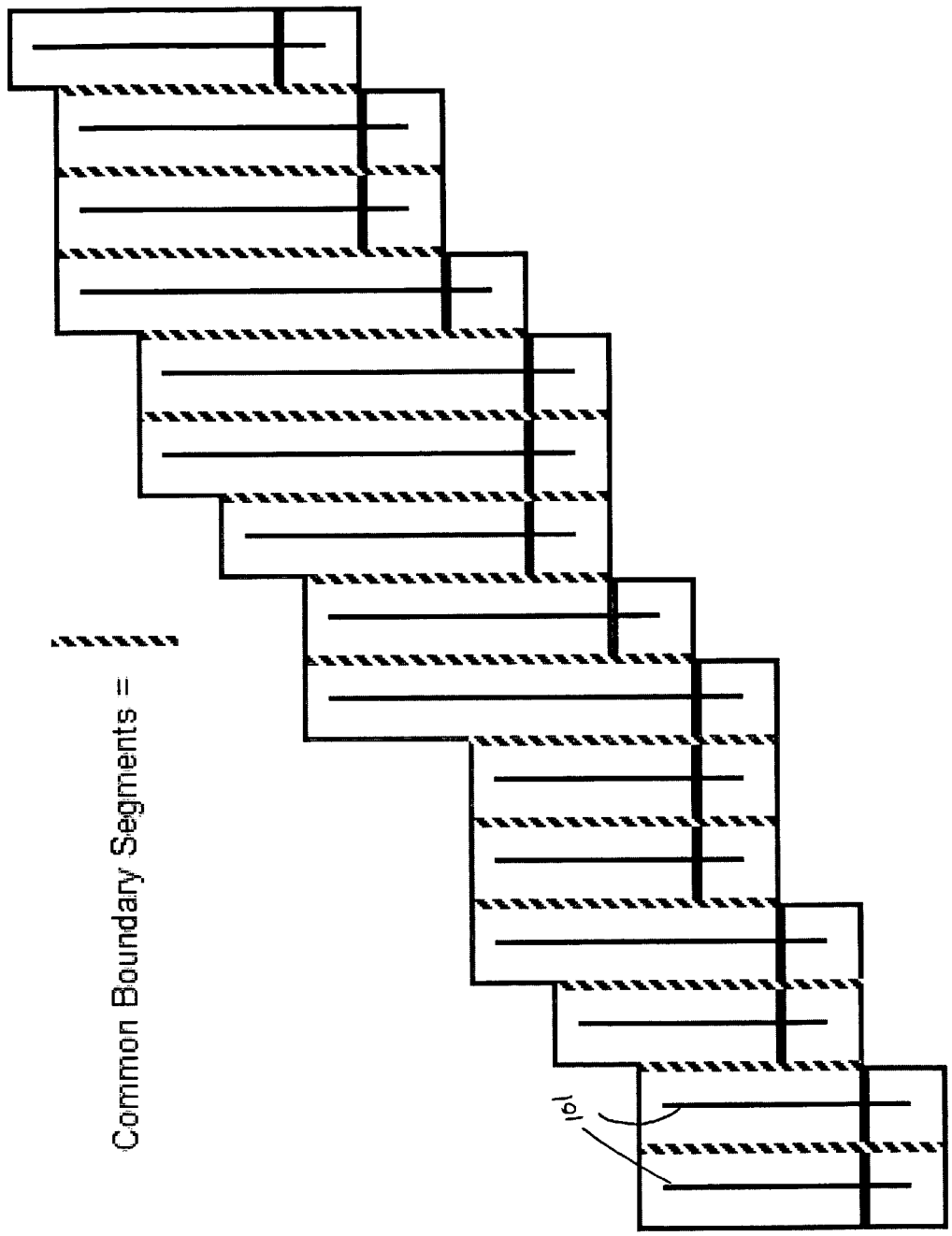
Figure 3: Grenze Set as Defined by Common Gradient Run Boundary Segments

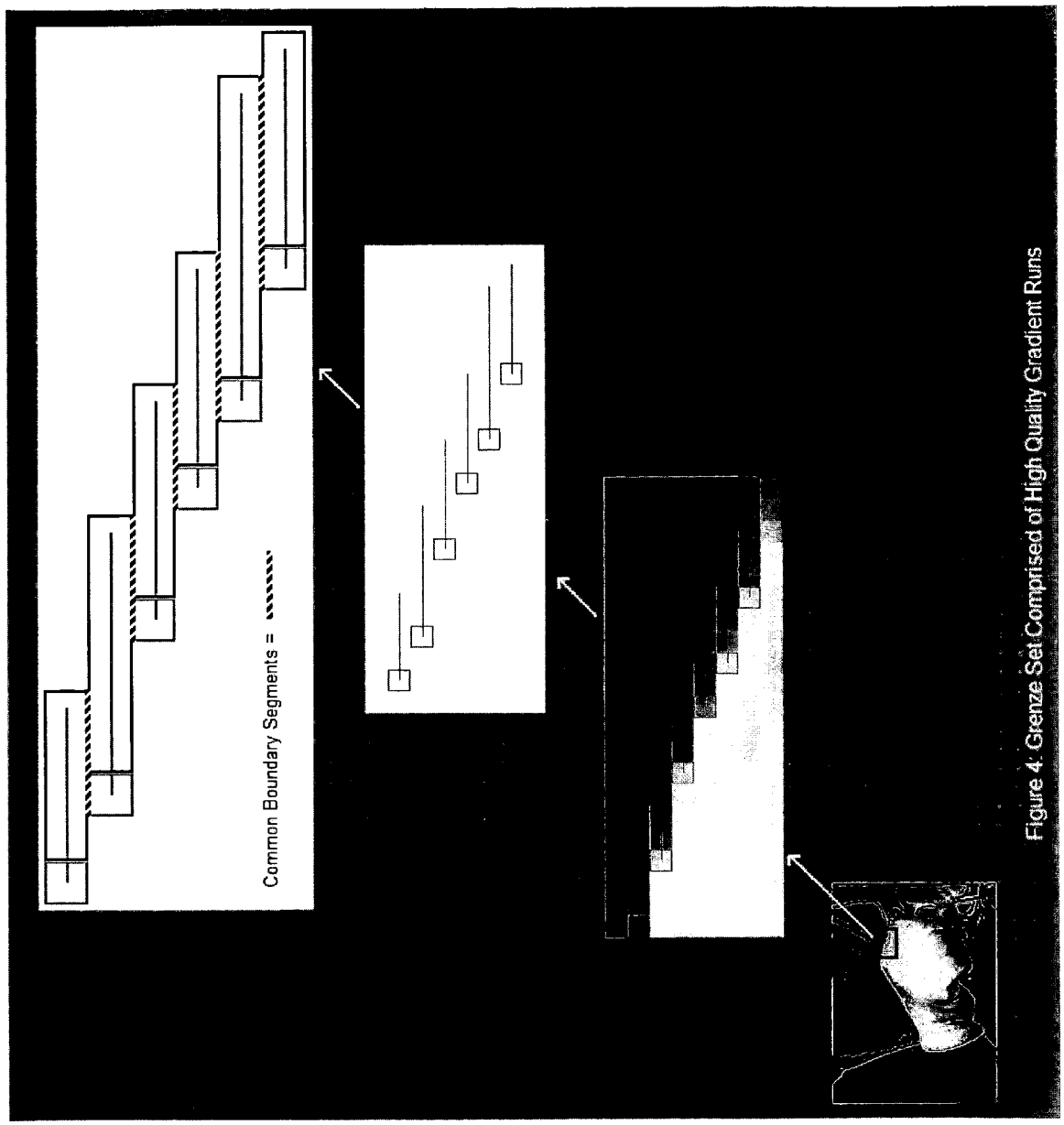

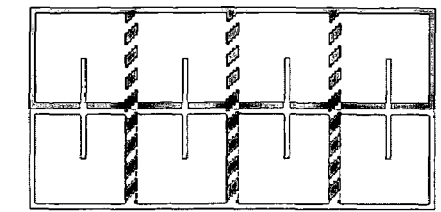
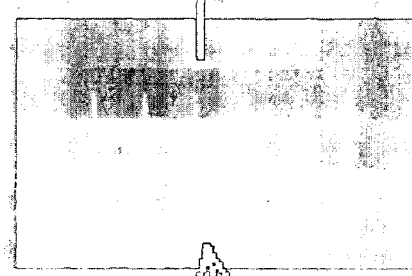
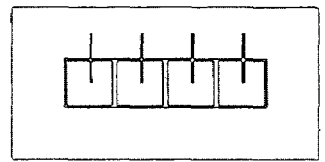
Figure 5: Grain Size Set Comprised of Low Quality Gradient Runs

METHOD AND SYSTEM FOR IDENTIFYING AN OBJECT IN AN ELECTRONICALLY ACQUIRED IMAGE

CROSS-REFERENCE TO RELATED APPLICATION

The present application claims priority to U.S. Provisional Application Ser. No. 60/749,660, filed Dec. 12, 2005, entitled "Identification of Objects in Video Images," the contents of which are hereby incorporated herein by reference.

FIELD OF THE INVENTION

This invention relates a computer system for the identification of objects within electronically acquired imagery. More specifically, this invention relates to an algorithm for resolving an image comprised of a multiplicity of pixels into separate groups of pixels, wherein each pixel group corresponds to a distinct physical object contained within the image.

BACKGROUND OF THE INVENTION

The general problem of using electronic computers to analyze and interpret electronically acquired imagery involves the analysis of images that are represented by a multiplicity of individual brightness samples distributed geometrically in space. These samples are often called pixels. Each pixel represents a numerical measurement of luminosity within a small solid angle with respect to the camera. In many cases, the problem of interpreting images composed of such multiplicities of pixels is identical to the problem of associating groups or subsets of pixels within the image with physical objects within the field of view of the camera or imaging instrument which made the image.

In many cases, the great majority of pixels within a given image bear little or no useful information. The information bearing pixels within a practical image will often be those pixels which fall along the boundaries of physical objects within the image, or along the boundaries of component parts of objects within the image.

Prior art methods of boundary discovery use first and second derivatives of image brightness, in conjunction with one or more threshold levels, to transform a raw image into an "edge-enhanced" image. This "enhanced" image is then passed as input to subsequent steps in the processing algorithm. Some of these methods, such as the Canny Edge Detection Operator, use directional filters (or kernels) to emphasize edge feature in certain directions.

The present disclosure describes an improvement to such prior art methods.

SUMMARY OF THE INVENTION

The present invention is directed to a system and method for identifying an object in an electronically acquired image that includes at least one two-dimensional array of pixels. A plurality of one-dimensional gradient runs oriented along a common direction in the two-dimensional array of pixels is identified. Each of the one-dimensional gradient runs includes three or more adjacent pixels ($P_1 \ldots P_k$) oriented along the common direction; wherein each of the one-dimensional gradient runs is defined by a common set of brightness trend parameters that include a brightness difference threshold (T) and at least one brightness difference direction parameter selected from the group comprising increasing brightness or decreasing brightness. First and second adjacent pixels ($P_1$, $P_2$) along each one-dimensional gradient run have a brightness difference that is greater than the threshold (T) and a difference direction that matches the at least one brightness difference direction parameter of the one-dimensional gradient run. Each subsequent pixel ($P_n$, n>1) after the first pixel ($P_1$) in each one-dimensional gradient run has a succeeding neighbor ($P_{n+1}$) oriented immediately after the pixel ($P_n$) along the common direction such that each adjacent pair of pixels ($P_n$, $P_{n+1}$, n>1) along each of the one-dimensional gradient runs has a difference that is unchanging or that matches the brightness difference direction parameter of the one-dimensional gradient run. In one embodiment, each one-dimensional gradient run includes a plurality (k) of pixels such that pixel $P_k$ represents a final pixel in the one-dimensional gradient run to satisfy the brightness difference direction parameter. Alternatively, each one-dimensional gradient run identified includes a plurality (k) of pixels such that pixel $P_k$ represents a first pixel in the one-dimensional gradient run: (i) that has a non-zero brightness difference with respect to $P_{k-1}$ of the one-dimensional gradient run, and (ii) that fails to satisfy the brightness difference direction parameter.

A second-order set of gradient runs is formed by selecting a group of previously identified one-dimensional gradient runs. Each of the one-dimensional gradient runs in the group has a pixel that is offset along an axis perpendicular to the common direction from a pixel in a neighboring one-dimensional gradient run in the group. Each of the one-dimensional gradient runs in the group also has at least one pixel that is immediately adjacent to a pixel in another one-dimensional gradient run in the group. The object is identified in the array using the second-order set of gradient runs.

In one embodiment, the object is identified in the array by systematically accounting for all possible valid interpretations of each one-dimensional gradient run using a plurality of predefined rules, wherein the predefined rules specify acceptable deviations from a set of acceptance norms for one-dimensional gradient runs that are consistent with an object of interest. Each interpretation is then systematically tested and invalid interpretations are ignored. This embodiment may be implemented using a tree with a plurality of nodes for systematically accounting for all possible interpretations of each one-dimensional gradient run. Each of the one-dimensional gradient runs in the second-order set of gradient runs is applied to the tree, wherein each node of the tree corresponds to an interpretation of a one-dimensional gradient run that is consistent with an object of interest. The second-order set of gradient runs is determined to correspond to the object of interest only if each one-dimensional gradient run in the second-order set falls with the acceptance norms associated with a node on the tree.

In some embodiments, each of the plurality of one-dimensional gradient runs is a linear arrangement of pixels that forms a straight line along a direction parallel to rows or columns of the array of pixels, or a diagonal line with respect to rows or columns of the array of pixels. Alternatively, each of the plurality of one-dimensional gradient runs corresponds in shape to an open curve, a closed curve or a polygon.

BRIEF DESCRIPTION OF THE DRAWINGS

FIG. 1 is a reference image that illustrates gradient runs and Grenze Sets identified using one embodiment of the present invention.

FIG. 2 is an expanded view of the highlighted area of interest of the image of FIG. 1 showing a vertically-oriented gradient run identified using one embodiment of the present invention.

FIG. 3 is an expanded view of the highlighted area of interest of the image of FIG. 1, showing a Grenze Set defined by common boundary segments of gradient runs identified in the area of interest using an embodiment of the present invention.

FIG. 4 depicts a Grenze Set formed of high-quality gradient runs identified using an embodiment of the present invention.

FIG. 5 depicts a Grenze Set formed of low-quality gradient runs identified using an embodiment of the present invention.

FIG. 12A is a reference image having superimposed thereon symbols identifying gradient runs in the image where the pixel brightness transitions from dark-to-light as one moves vertically from top to bottom along the reference image, in accordance with the present invention.

DETAILED DESCRIPTION OF THE PREFERRED EMBODIMENT

Figure 6A:
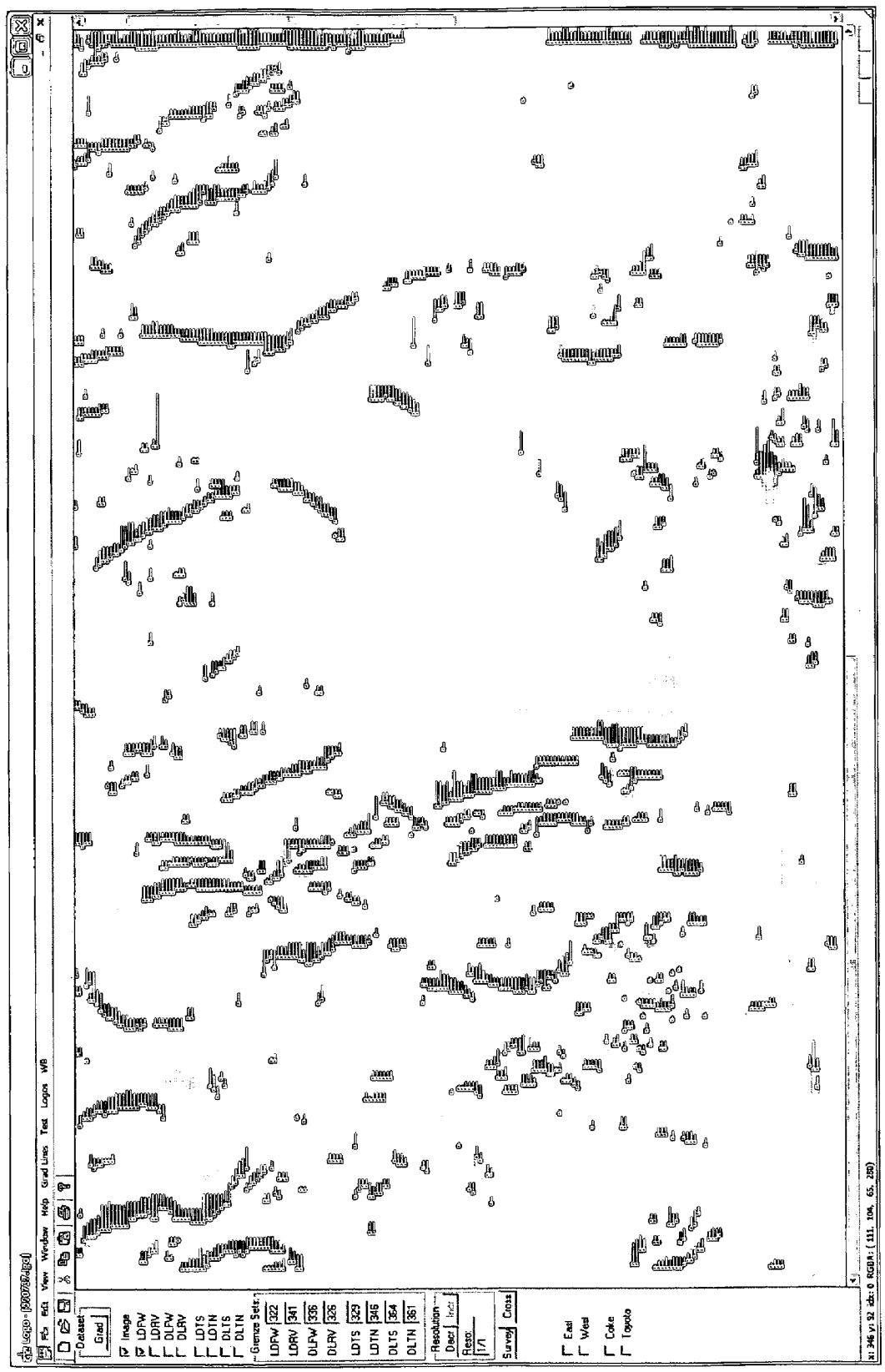
FIG. 6A is a reference image having superimposed thereon symbols identifying gradient runs in the image where the pixel brightness transitions from light-to-dark as one moves from left to right across the reference image, in accordance with the present invention.
Figure 6B:
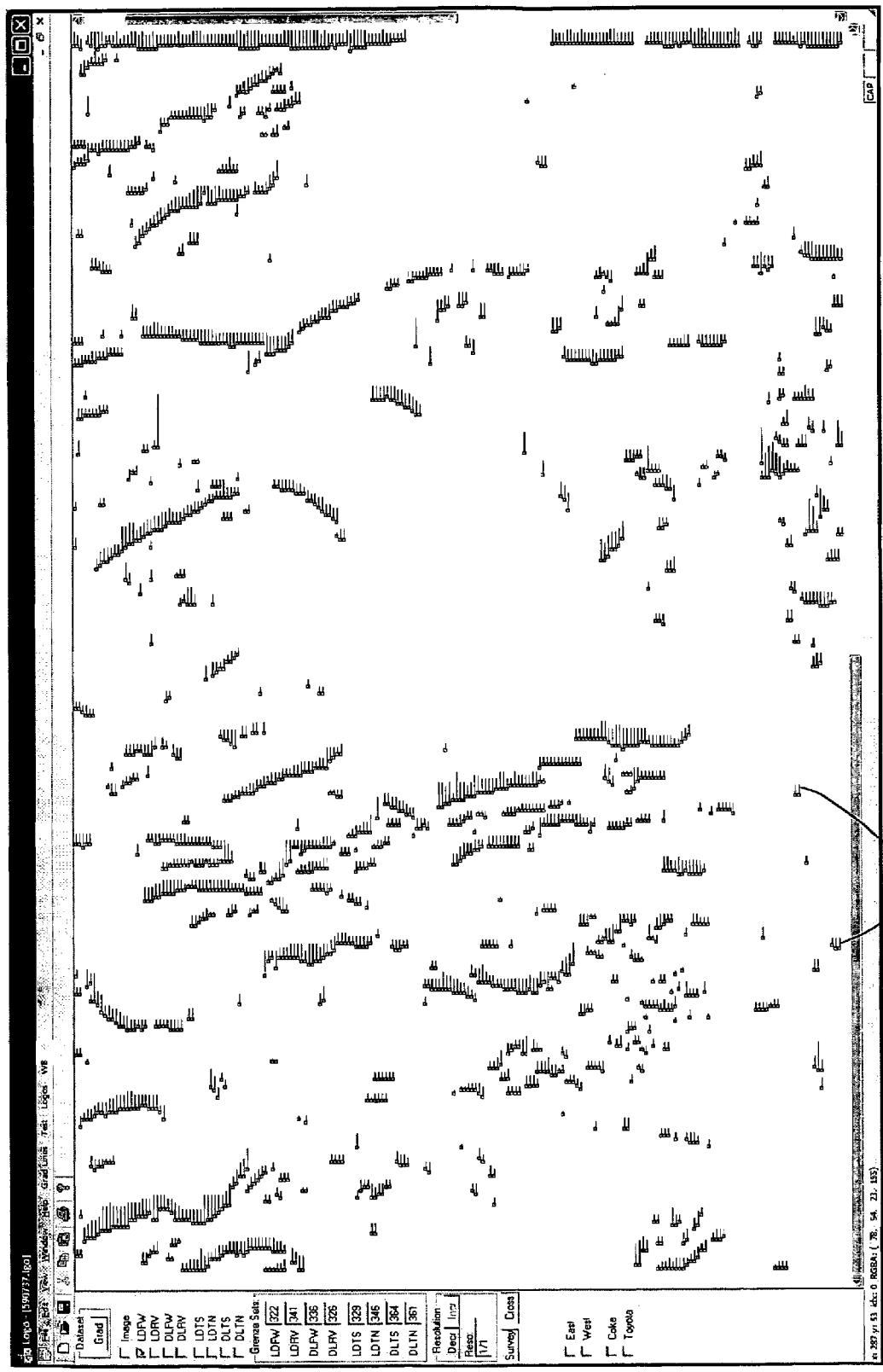
FIG. 6B illustrates the gradient runs shown in FIG. 6A, in the absence of the background reference image.
Figure 7A:
FIG. 7A is a reference image having superimposed thereon symbols identifying gradient runs in the image where the pixel brightness transitions from light-to-dark as one moves from right to left across the reference image, in accordance with the present invention.
Figure 7B:
FIG. 7B illustrates the gradient runs shown in FIG. 7A, in the absence of the background reference image.
Figure 8A:
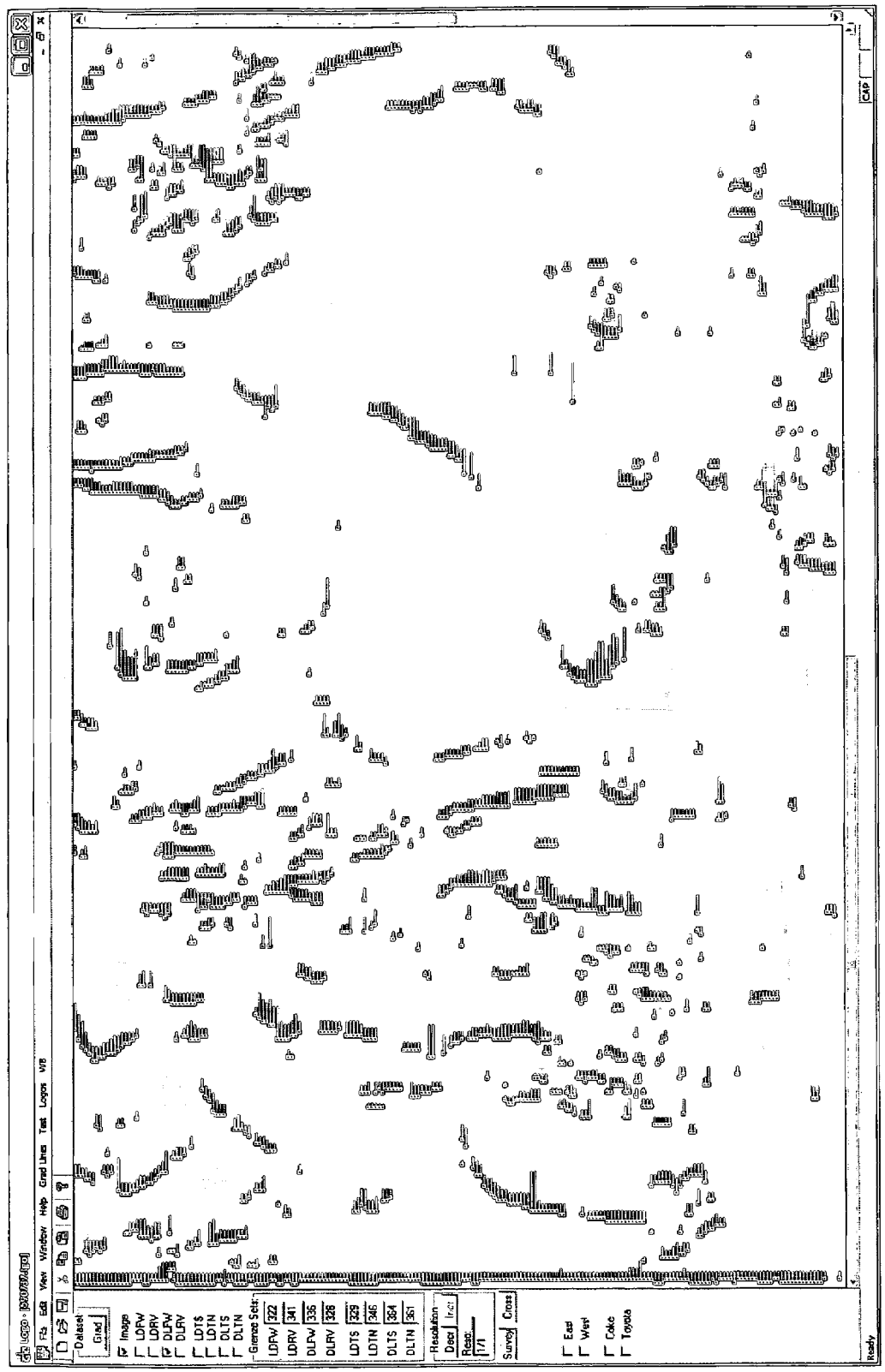
FIG. 8A is a reference image having superimposed thereon symbols identifying gradient runs in the image where the pixel brightness transitions from dark-to-light as one moves from left to right across the reference image, in accordance with the present invention.
Figure 8B:
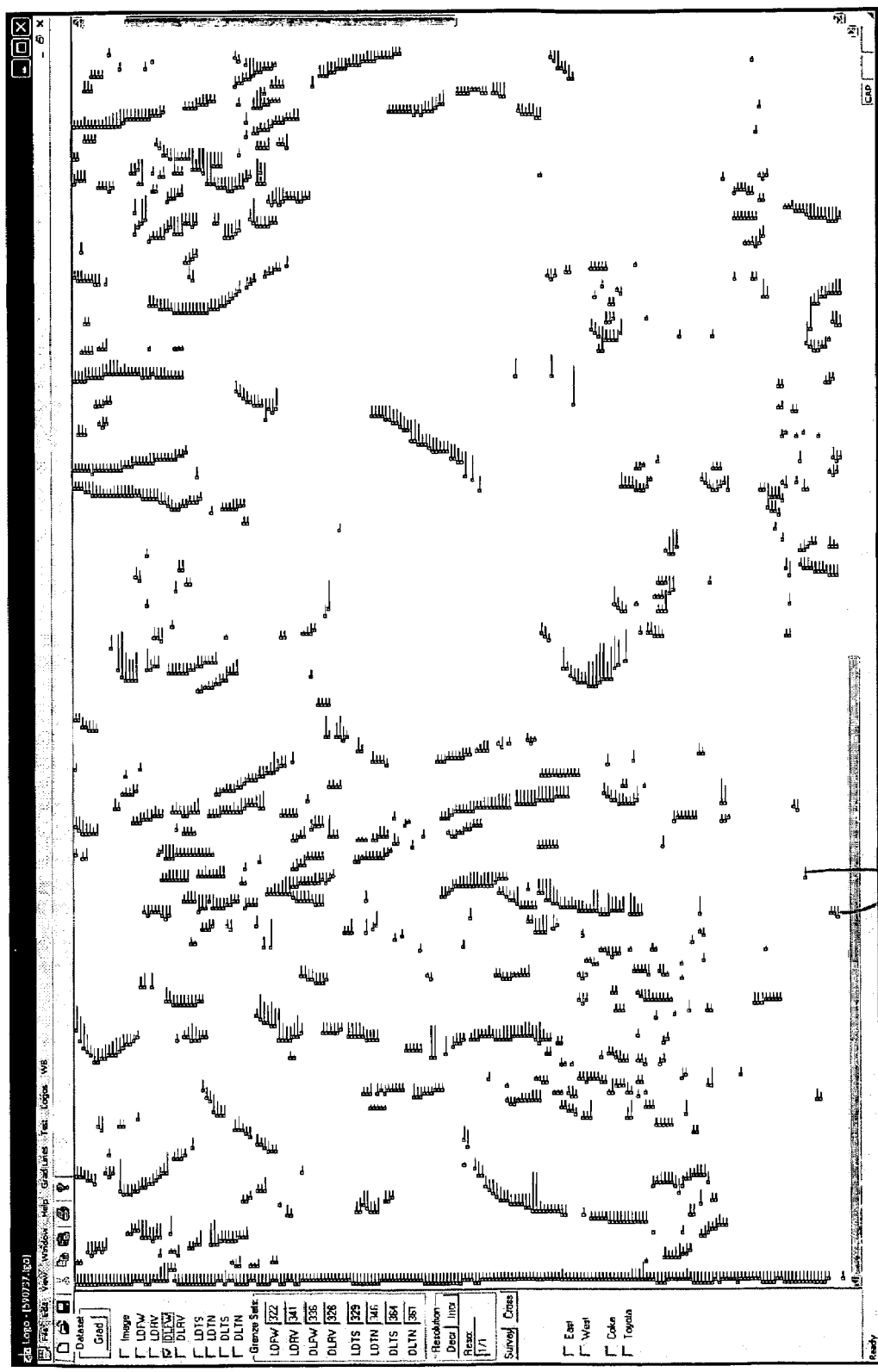
FIG. 8B illustrates the gradient runs shown in FIG. 8A, in the absence of the background reference image.
Figure 9A:
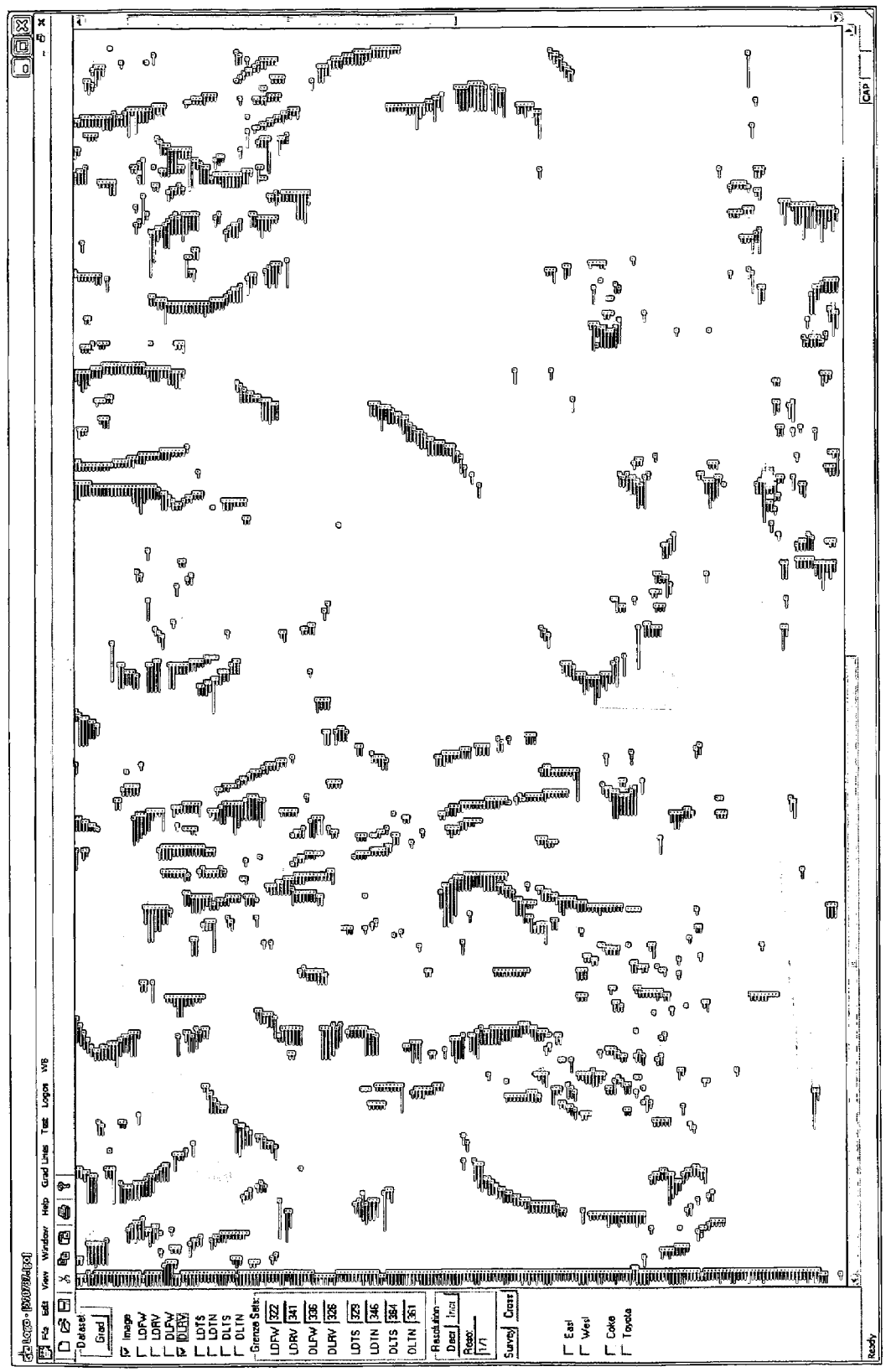
FIG. 9A is a reference image having superimposed thereon symbols identifying gradient runs in the image where the pixel brightness transitions from dark-to-light as one moves from right to left across the reference image, in accordance with the present invention.
Figure 9B:
FIG. 9B illustrates the gradient runs shown in FIG. 9A, in the absence of the background reference image.
Figure 10A:
FIG. 10A is a reference image having superimposed thereon symbols identifying gradient runs in the image where the pixel brightness transitions from light-to-dark as one moves vertically from top to bottom along the reference image, in accordance with the present invention.
Figure 10B:
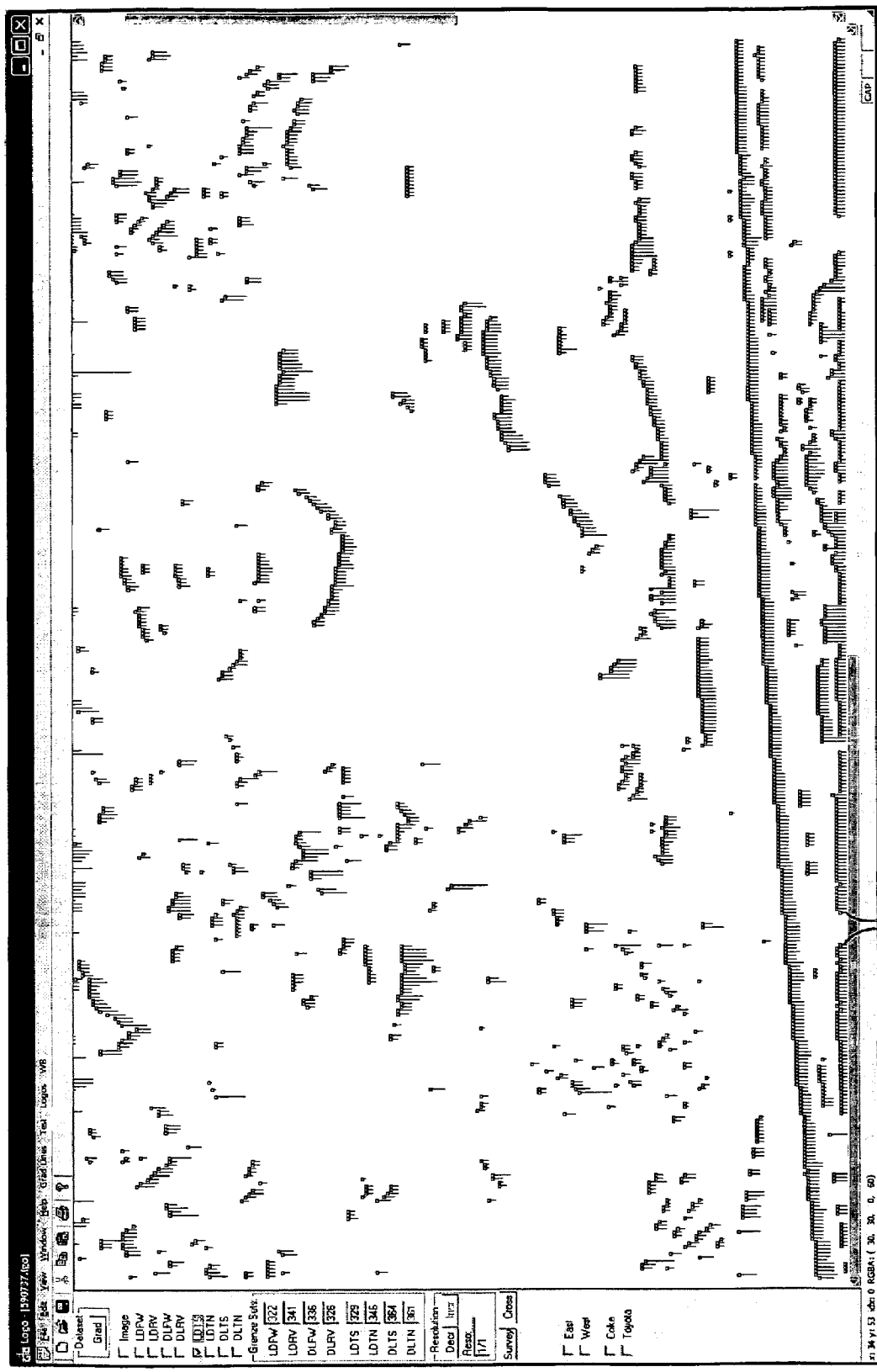
FIG. 10B illustrates the gradient runs shown in FIG. 10A, in the absence of the background reference image.
Figure 11A:
FIG. 11A is a reference image having superimposed thereon symbols identifying gradient runs in the image where the pixel brightness transitions from light-to-dark as one moves vertically from bottom to top along the reference image, in accordance with the present invention.
Figure 11B:
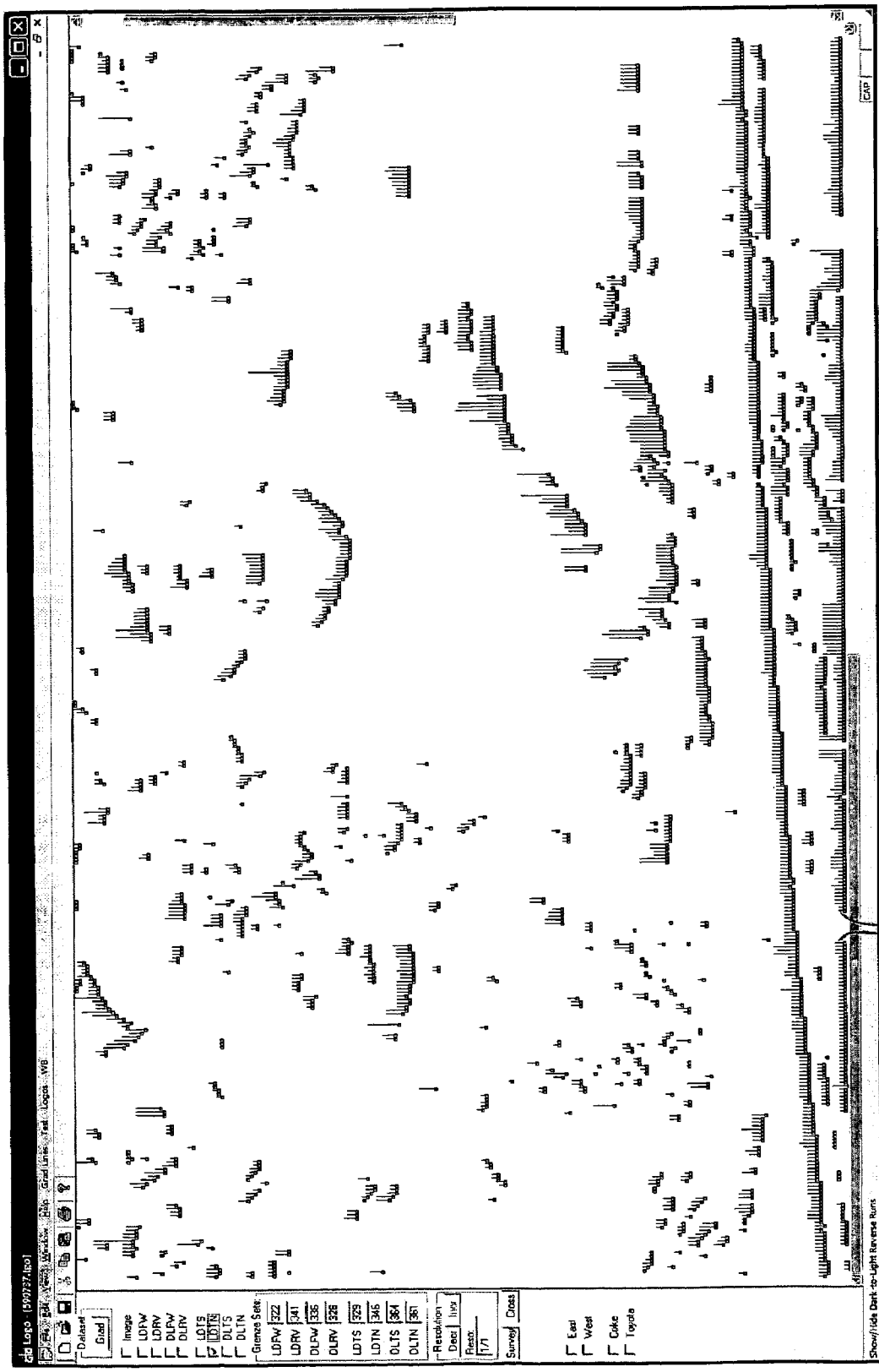
FIG. 11B illustrates the gradient runs shown in FIG. 11A, in the absence of the background reference image.
Figure 19A:
Figure 12B:
FIG. 12B illustrates the gradient runs shown in FIG. 12A, in the absence of the background reference image.

The present disclosure relates to a system and method for identifying specific regions of an electronically acquired image. The boundaries of the regions are distinguished on the basis of their brightness relative to the brightness of the neighboring pixels which are not positioned on the boundary lines. The regions are comprised of those pixels that fall on the boundary lines, and comprise groups of pixels having within which the brightness or color varies rapidly.

Much of the information present in an image is in the form of brightness gradients that exist within the image. The concept of a "brightness gradient" cannot be understood in terms of a single pixel. A "brightness gradient" is related to the mathematical concept of "gradient." A gradient is, by definition, a vector quantity, which is to say it has magnitude and direction. A brightness gradient has magnitude and direction as well. Because an electronically acquired image is an approximation of the actual physical scene (approximated by means of decomposition into discrete numerical samples, each of which represents the luminosity of the scene at one point), the "brightness gradients" which comprise the information-bearing parts of the electronically acquired image are also approximations by virtue of this sampling process. In this disclosure, "brightness gradients" correspond to brightness as characterized by a single composite value which is the summation of all wavelengths of light to which the electronic camera is sensitive (as in the case of "monochrome" cameras, whether they are sensitive to wavelengths of light that are visible to the human eye, or to other wavelengths, such as in infra-red, ultra-violet, or other image sensing means), or to brightness as characterized by a collection of component wavelength ranges, as in the case of electronic cameras that are configured to acquire "color," or multi-spectral, images. The inventive method described here is applicable to monochromatic images as well as polychromatic (or "color") images.

The numerical value of these boundary pixels can be characterized in terms of brightness gradients. By the term "gradient" is meant a plurality of neighboring pixels arranged in a line. Frequently this linear arrangement will take the form of a straight line oriented in a direction congruent with that of the constituent rows and columns of the pixel array which forms the image. However, the present invention is not limited to gradient pixel sets that are linear and parallel to the rows and columns of the pixel array which forms the image. The present invention is useful also in cases in which the gradient pixel sets form other geometrical shapes, such as open or closed curves, polygons, etc. Furthermore, the concept of a brightness gradient, in the case of color imagery, will correspond to a set of separate co-located gradients, this set having a quantity of elements equal to the number of constituent color components detected by the image-forming instrument.

A set of pixels constituting a gradient can be thought of as a single one-dimensional entity, whether that one-dimensional gradient set is arranged as a straight line segment, or as a curve, or in some other arrangement. For purposes of the descriptive material to follow, this disclosure shall refer to such a one-dimensional gradient set of neighboring pixels as a "gradient run." A gradient run may correspond to a one-dimensional set of pixels oriented in a direction or manner that is other than parallel to the direction of a boundary line between distinct objects within the field of view of the imaging instrument. It is not necessary that the one-dimensional set of pixels be arranged in a line segment, and if the one-dimensional set of pixels is arranged in a line segment, it is not necessary that the direction of this line segment be perpendicular to that of the boundary line marking the division between two or more distinct objects in the field of view of the imaging instrument.

As has already been stated, gradient runs comprise one-dimensional collections of pixels. In order to address practical images having objects comprising two-dimensional arrays of pixels, it is necessary to compose two-dimensional gradient representations of the information-bearing regions of electronically-acquired imagery. In the present disclosure, these two-dimensional gradient representations are comprised of a plurality of gradient runs, as that term has been defined above. The disclosure uses the term "Grenze Sets" to describe these two-dimensional gradient representations. As described more fully below, a Grenze Set is comprised of a plurality of gradient runs that are adjacent to one another.

The disclosed method creates a second order of grouping in which the aforementioned gradient runs are themselves grouped into larger collections. The criterion by which the first-order gradient pixel groups are assembled into second-order gradient pixel groups is that of proximity. These "second order gradient pixel groups" are referred to herein as Grenze Sets. In one embodiment, a given first-order gradient pixel group 'A' is added to a second-order gradient pixel group, having one of its two extreme ends 'B' if some or all of the pixels that comprise group 'A' are immediate neighbors of some or all of the pixels contained in 'B.'

The first-order gradient pixel groups, referred to as "gradient runs," are comprised of linear collections of adjacent pixels who's brightness is monotone (that is, steadily and without interruption) increasing or decreasing. Each gradient run may also (optionally) continue through those adjacent pixels exhibiting a "flat," or unchanging brightness value. The first pixel of the gradient run will be one having brightness which differs from its immediate neighbor by an amount greater than some threshold 'T'. The last pixel of the gradient run will be that pixel which is the first to interrupt the brightness trend, whether it be increasing or decreasing, by going against this trend. Whether or not those pixels which exhibit a "flat" or unchanging, brightness value over some spatial interval are included within the set of pixels constituting a given gradient run is optional. This definition of "gradient run" can be applied to the separate color components that are co-located and superimposed, as is the case in multi-colored electronically acquired imagery. In such multi-colored electronically acquired imagery, there would be occasions in which second-order gradient pixel groups would form in one color but not in others, depending upon the hue and shade of the subject material depicted in the electronically acquired image.

Just as the electronically acquired image is composed of elements called pixels, the gradient information in the image can be seen to be composed of elements as well. These gradient elements are referred to herein by the term "gradient runs." A "gradient run" is a collection of three or more pixels, arranged along a one-dimensional path (which may be straight or a contour.) Frequently this path will be a straight line, oriented in a direction parallel to the rows or columns of the pixel array that comprises the image. However, there is nothing about this inventive method that precludes the arrangement of the pixels which comprise the gradient runs which embody the gradient information of the electronically acquired image as simple or complex curves, or even as closed loops. Linear arrangements of pixels may also be in straight lines that are not parallel to the rows or columns of the pixel array that comprises the image. For example, gradient runs can be formed from sets of pixels arranged diagonally, or at some composite angle neither diagonal nor parallel to the rows or columns of the pixel array that comprises the image.

The pixels that comprise these one-dimensional paths or contours are ordered numerically, starting at some index 'N' (typically the start index will be zero, but not always) and proceeding up or down in numerical order to some other index "N-prime." The exact choice of numerical values which are assigned to the pixels which make up these one-dimensional paths is of no particular importance, other than as a method for unambiguously identifying these pixels and assigning to them a fixed order.

A "gradient run" is a set of pixels, oriented along some defined one-dimensional path or contour, having these two properties: (1) that the first pixel in the gradient run differs in brightness from the brightness of the pixel immediately preceding it on the defined one-dimensional path or contour by an amount greater than some "threshold value," and (2) as one moves along the defined one-dimensional path, the last pixel in the gradient run is that pixel which reverses the monotone (i.e. steadily increasing or steadily decreasing) trend of brightness of the pixels which followed the "threshold value" pixel.

FIG. 1 is a reference image from which the material that follows is derived. In the particular case shown in FIG. 1, each gradient run 101 is oriented south-to-north, and is comprised of pixels having brightness trending light-to-dark. This type of gradient run is referred to this as the "dark-to-light, south-to-north" gradient run.

FIG. 2 shows a vertically-oriented gradient run. The pixel at x=92, y=74 represents the beginning of this particular gradient run. The pixel at x=92, y=70 represents the end of the gradient run. The gradient run begins with the first pair of pixels having a brightness difference which exceeds a given threshold brightness level (in this case the threshold value is set to 60). The gradient run ends with the last pixel in the monotone-decreasing series. This pixel has a brightness value of 145; the next pixel in index order has a brightness value of 170. This reverses the monotone-decreasing trend.

Gradient runs are characterized by quality and strength. Quality is the length of the gradient run. Strength is the net change in brightness from one end of the gradient run to the other. "Strength" and "quality" provide metrics for identifying order in an image that is statistically unlikely to occur by accident. Another aspect of "strength" and "quality" is their ability to identify order in an image that is likely to indicate the presence of a physical object or a component part of an object.

Figure 13A:
FIG. 13A is a reference image having superimposed thereon symbols identifying gradient runs in the image where the pixel brightness transitions from dark-to-light as one moves vertically from bottom to top along the reference image, in accordance with the present invention.
Figure 13B:
FIG. 13B illustrates the gradient runs shown in FIG. 13A, in the absence of the background reference image.

Any other combinations of brightness can be used to define different types of gradient runs. These include (but are not limited to) "dark-to-light right to left," "dark-to-light left to right," "light-to-dark right to left," etc. Gradient runs can be oriented horizontally, vertically, diagonally, along straight lines that are neither vertical, horizontal, nor diagonal, and along one-dimensional curves, polygons, or loops. For purposes of illustration, FIGS. 6A, 7A, 8A, 9A, 10A, 11A, 12A and 13A show a common reference image having superimposed thereon symbols identifying gradient runs in the image where the pixel brightness transitions respectively from light-to-dark as one moves from left to right across the reference image (FIG. 6A), from light-to-dark as one moves from right to left across the reference image (FIG. 7A), from dark-to-light as one moves from left to right across the reference image (FIG. 8A), from dark-to-light as one moves from right to left across the reference image (FIG. 9A), from light-to-dark as one moves vertically from top to bottom along the reference image (FIG. 10A), from light-to-dark as one moves vertically from bottom to top along the reference image (FIG. 11A), from dark-to-light as one moves vertically from top to bottom along the reference image (FIG. 12A), and from dark-to-light as one moves vertically from bottom to top along the reference image (FIG. 13A). FIGS. 6B, 7B, 8B, 9B, 10B, 11B, 12B and 13B respectively show the gradient runs of FIGS. 6A, 7A, 8A, 9A, 10A, 11A, 12A and 13A, in the absence of the background image.

In the case of color images, the eight different gradient run definitions illustrated in FIGS. 6B, 7B, 8B, 9B, 10B, 11B, 12B and 13B may be extended to create 24 gradient run definitions for each image. For example, in color or multi-spectral images that can be segregated in Red, Green and Blue component images, there will be a separate set of the eight gradient run definitions illustrated in FIGS. 6B, 7B, 8B, 9B, 10B, 11B, 12B and 13B for each of the Red, Green and Blue component images.

A Grenze Set is formed by grouping together gradient runs that are "in contact" with one another. "In contact" means that one or more of the pixels which comprise one constituent gradient run (call it "gradient run 'A'"), oriented, say, in the horizontal direction, are immediately adjacent to one or more pixels of an immediately adjacent gradient run, either above or below gradient run 'A'. FIG. 3 represents a Grenze Set defined by the common "boundary segments" of the Gradient Runs 101 outlined in the area of interest highlighted in FIG. 1.

Gradient runs of higher quality (that is, of greater length) will support the construction of Grenze Sets that are more nearly horizontal (again assuming horizontal gradient runs). Gradient runs of lower quality (that is, comprised of fewer monotone-increasing or -decreasing pixel brightness) will support only Grenze Sets that are oriented vertically, or nearly so (within 45 degrees of the vertical line).

FIG. 4 depicts a Grenze Set formed of high-quality Gradient Runs. "High-quality" means Gradient Runs that are long (the Gradient Runs shown in FIG. 4 are from five to eight pixels in length). Note that this Grenze Set is nearly horizontal.

FIG. 5 depicts a Grenze Set formed of low-quality Gradient Runs. "Low-quality" means Gradient Runs that are short (the Gradient Runs shown in FIG. 5 are only two pixels in length). Low-quality horizontal gradient runs will not support Grenze Sets that deviate very much from the vertical. Similarly, low-quality vertical gradient runs will not support Grenze Sets that deviate very much from the horizontal.

Of course, the description just made can be equally applicable to Grenze Sets oriented at or near the horizontal, if the gradient runs from which they are assembled are oriented vertically. Indeed, the concept may be further abstracted, to gradient runs that are oriented diagonally, or, in fact at any angle. In fact, the "vertical" and "horizontal" orientation of the constituent gradient runs is imposed more by the pixel arrangement geometry of commonly available video cameras than by any physical or scientific reason; we anticipate that cameras will soon be made with pixels arranged in other than orthogonal rows and columns. Perhaps, in fact, cameras will some day be built with pixels that are randomly, or quasi-randomly arranged, or arranged according to some curvilinear scheme yet to be described.

Regardless of the particular geometric arrangement scheme used to locate the individual pixels of a particular image-forming element of a camera, the Grenze Set concept will still be valid and useful. In any such pixel arrangement scheme it will be possible to describe one-dimensional contiguous collections of pixels, whether they be arranged as straight or curved linear order, in which the brightness of these pixels varies as described in this patent, and the further assembly of collections of these brightness-varying linear or curvilinear collections (earlier called "Gradient Runs") into sets consisting of Gradient Runs which share one or more elements at boundaries with their neighbors.

Additionally, camera image-forming elements, which function to resolve sensible images into collections of picture elements (or "pixels") in which information about the color or hue of the subject image is preserved, are typically comprised of separate collections of pixels, co-located in space, comprising two, three, or more subsets of pixels differently sensitized to the various frequencies and wavelengths of optical radiation, those frequencies or wavelengths being sensible to the human eye as different colors and hues. In the case of cameras and camera image-forming elements of this type, the Gradient Run concept, and, springing from it, the Grenze Set concept, shall continue to be valid, modified only to the extent that the several Grenze Sets from which a sensible image is comprised will typically be formed from Gradient Runs associated with a particular color, hue, wavelength, or frequency. Thus, the various Grenze Sets from which a particular image is composed, and which have been derived from a given sensible image acquired with a color-sensitive camera or camera image-forming elements as described, will comprise two, three, or more separate subsets of Grenze Sets, where the cardinality of the set of Grenze Sets will be equal to the number of separate colors, hues, wavelengths or frequencies of optical radiation for which the camera image-forming elements are adjusted by the arts of manufacture to detect or acquire.

Figure 14:
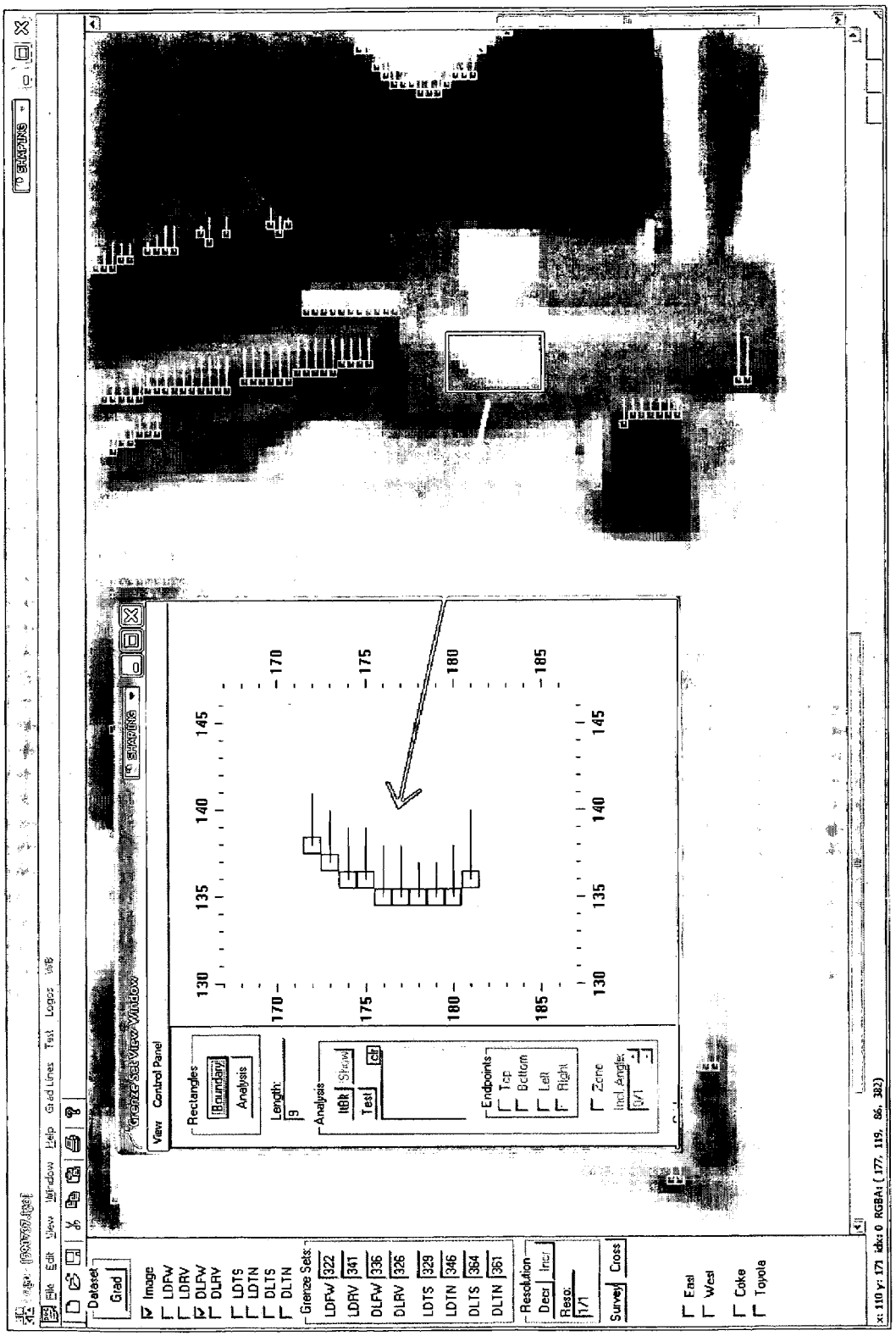
FIG. 14 illustrates a Grenze Set identified in a reference image in accordance with the present invention.

In one embodiment, an object of interest (such as the curve of a logo, as shown on the glass in FIG. 14) is identified in a pixel array by systematically accounting for all possible valid interpretations of each one-dimensional gradient run using a plurality of predefined rules, wherein the predefined rules specify acceptable deviations from a set of acceptance norms for one-dimensional gradient runs that are consistent with the object of interest. Each interpretation is then systematically tested and invalid interpretations are ignored. This embodiment may be implemented using a tree (such as the one shown in FIG. 15) with a plurality of nodes for systematically accounting for all possible interpretations of each one-dimensional gradient run. Thus, in the examples of FIGS. 14 and 15, each of the one-dimensional gradient runs in the second-order set of gradient runs shown in FIG. 14 is applied to the tree of FIG. 15. Each node of the tree corresponds to an interpretation of a one-dimensional gradient run that is consistent with the object of interest (i.e., the curve of the logo). The second-order set of gradient runs is determined to correspond to the object of interest only if each one-dimensional gradient run in the second-order set falls with the acceptance norms associated with a node on the tree.

Figure 15:
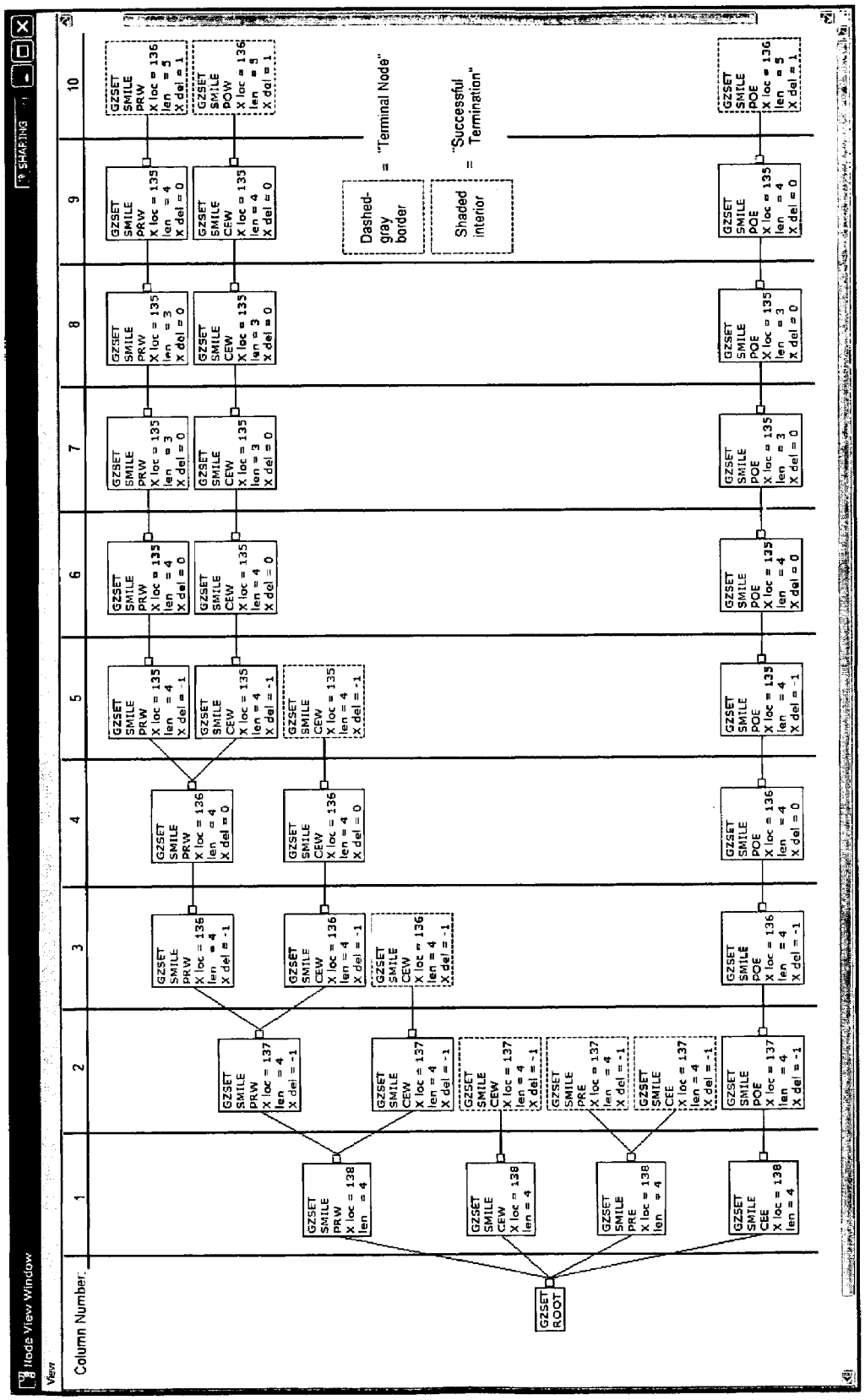
FIG. 15 illustrates a tree for determining whether each of the gradient runs in the Grenze Set of FIG. 14 corresponds to a particular object of interest, in accordance with the present invention.

FIG. 15 is a graphical representation of the Grenze Set highlighted in FIG. 14. Each of the individual rectangles shown in FIG. 15 represents a single hypothetical interpretation of a single gradient run within the Grenze Set of FIG. 14. In this case, the Grenze Set being analyzed is composed of horizontally-oriented gradient runs; for this reason, the Grenze Set is oriented more or less vertically. The tree diagram shown in FIG. 15 is divided into columns, each of which corresponds to the left-most pixel of one of the first-order gradient runs which constitute this Grenze Set. Column 1 of FIG. 15 thus corresponds to the pixel located at x=138, y=172. Each column is occupied by a multiplicity of individual rectangles, each of which represents one node of a search tree; each of these nodes represents every possible hypothetical interpretation of this gradient run under the rules for all possible primitives for which the image is being examined. In the case of FIG. 15, there are two such primitives, which are referred to as a "West Smile" and an "East Smile."

Thus, in Column 1 there are four node rectangles, two of which correspond to hypothetical "West Smiles," and two of which correspond to hypothetical "East Smiles." The "West Smile" nodes are labeled GZSET SMILE PRW and GZSET SMILE CEW. The "East Smile" nodes are labeled GZSET SMILE PRE and GZSET SMILE CEE. Here the GZSET SMILE nomenclature indicates "Grenze Set: Smile," and the abbreviations PRW, CEW, PRE, and CEE indicate "Pre-West, Center West, Pre-East, and Center East. "Pre-West" refers to those first-order gradient runs which comprise that part of the smile occurring "before" (that is "to the north of," in the top-to-bottom ordering scheme imposed by the way in which data is taken from the image) the purely vertical part of the smile. "Center West" means those first-order gradient runs which comprise that part of the smile constituting a "purely vertical" interval of first-order gradient runs, which is to say that set of first-order gradient runs having "trigger" pixels arranged in an unbroken vertical array.

In Column 2 there are six nodes. Two of these are spawned from the PRW node, one from the CEW node, two from the PRE node, and one from the CEE node. Each of these six nodes represents separate hypothetical interpretation of the "meaning" of the first-order gradient run that begins with the pixel at x=137, y=173, as shown in FIG. 14.

The PRW node (or "Pre-West" node) spawns another PRW node, and a CEW node. Each of these nodes represents a "forward looking" hypothesis; thus, the determination of whether or not a given node's hypothetical meaning is correct or not is deferred until that node is actually created, and, perhaps, even longer. In this way, a given branch of the tree can be made to persist until sufficient information has been collected by that branch (by looking out, or forward, along the Grenze Set under evaluation) to settle unambiguously the question of whether or not the given chain of hypothetical interpretations is the correct one under the set of predefined rules which specify acceptable deviations from a set of acceptance norms for one-dimensional gradient runs that are consistent with an object of interest. In the present example, sufficient information for "pruning," or terminating, the column-1 descendant nodes is present for three of the six descendant nodes at column 2. Thus, three of the column-2 nodes "survive" to spawn descendants of their own, and three "fail;" the three "failing," or "terminal" nodes are shown with dashed gray-and-black borders.

This analytical sequence continues for each of the remaining eight first-order gradient runs in the Grenze Set. For this Grenze Set, as can be seen in column 10, a "West Smile" primitive is successfully identified (as indicated by the lightly-shaded rectangle with the dashed gray-and-black border). This successful outcome represents the unambiguous identification of a "West Smile;" and the unambiguous nature of this identification is possible only because the "final verdict," as it were, is deferred, or delayed, until enough information has accumulated along the "path of hypotheses" to remove all doubt as to the correct naming scheme for each of the first-order gradient runs encountered along the length of the Grenze Set.

The teachings of the present invention may be used for analysis of video images to identify objects such as product logos, cars, weapons, people and other objects of interest. The tree shown in FIG. 15 is useful for identifying whether a Grenze Sets corresponds to an object of interest comprising a single primative (i.e., a smile, line, corner, arc, circle, curve, line or shape). In a typical screen of video data, most of the primitives are meaningless and must be thrown away. In a small number of cases, however, an ordered collection of primatives may correspond to an object of interest, such as a logo having two curves with a predetermined relationship. In this sense, primatives are like the letters of the alphabet. A page of randomly arranged letters is meaningless. Placed in proper order, however, these same letters can convey a vast amount of information.

The teachings of the present invention may be applied to identify an object of interest having a known spatial relationship to another distinctive object. In other words, if it is known that a primary object of interest will have a specific relationship to a secondary object in an image, the primary object of interest may be found by looking for the secondary object. For example, the Coca-Cola® logo in FIG. 14 is known to be attached to a glass of distinctive shape and color. Using this approach, one could look for the Coca-Cola® logo in future images by looking for the distinctive glass, which is a larger, less complex shape that may be easier to identify.

The disclosure described above maybe implemented in software on a special purpose or general computer processor.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for identifying an object in an electronically acquired image that includes at least one two-dimensional array of pixels, comprising:

(a) identifying a plurality of one-dimensional gradient runs oriented along a common direction in the two-dimensional array of pixels; wherein each of the one-dimensional gradient runs includes three or more adjacent pixels ($P_1 \ldots P_k$) oriented along the common direction; wherein each of the one-dimensional gradient runs is defined by a common set of brightness trend parameters that include at least one brightness difference threshold (T) and a brightness difference direction parameter selected from the group comprising increasing brightness or decreasing brightness; wherein first and second adjacent pixels ($P_1, P_2$) along each one-dimensional gradient run have a brightness difference that is greater than the threshold (T) and a difference direction that matches at least one the brightness difference direction parameter of the one-dimensional gradient run; and wherein each subsequent pixel ($P_n$, n>1) after the first pixel ($P_1$) in each one-dimensional gradient run has a succeeding neighbor ($P_{n+1}$) oriented immediately after the pixel ($P_n$) along the common direction such that each adjacent pair of pixels ($P_n, P_{n+1}$, n>1) along each of the one-dimensional gradient runs has a difference that is unchanging or that matches the brightness difference direction parameter of the one-dimensional gradient run;

(b) forming a second-order set of gradient runs by selecting a group of one-dimensional gradient runs identified in step (a); wherein each of the one-dimensional gradient runs in the group has a pixel that is offset along an axis perpendicular to the common direction from a pixel in a neighboring one-dimensional gradient run in the group; and wherein each of the one-dimensional gradient runs in the group has at least one pixel that is immediately adjacent to a pixel in another one-dimensional gradient run in the group; and (c) identifying the object in the array using the second-order set of gradient runs.

2. The method of claim 1, wherein each one-dimensional gradient run identified in step (a) includes a plurality (k) of pixels such that pixel $P_k$ represents a first pixel in the one-dimensional gradient run that fails to satisfy the brightness difference direction parameter.

3. The method of claim 1, wherein each one-dimensional gradient run identified in step (a) includes a plurality (k) of pixels such that pixel $P_k$ represents a first pixel in the one-dimensional gradient run: (i) that has a non-zero brightness difference with respect to $P_{k-1}$ of the one-dimensional gradient run, and (ii) that fails to satisfy the brightness difference direction parameter.

4. The method of claim 1, wherein step (c) comprises:
(i) systematically accounting for all possible valid interpretations of each one-dimensional gradient run using a plurality of predefined rules, wherein the predefined rules specify acceptable deviations from a set of acceptance norms for one-dimensional gradient runs that are consistent with an object of interest; and
(ii) systematically testing each interpretation wherein invalid interpretations are ignored.

5. The method of claim 4, wherein step (c) (i) uses a tree with a plurality of nodes for systematically accounting for all possible interpretations of each one-dimensional gradient run, and step (c) (ii) is performed by:
applying each one-dimensional gradient run in the second-order set of gradient runs to the tree, wherein each node of the tree corresponds to an interpretation of a one-dimensional gradient run that is consistent with an object of interest; and
determining that the second-order set of gradient runs corresponds to the object of interest only if each one-dimensional gradient run in the second-order set falls with the acceptance norms associated with a node on the tree.

6. The method of claim 5, wherein the tree corresponds to an object of interest formed from a plurality of primitives, wherein each of the plurality of primitives is selected from the group consisting of: a smile, line, corner, arc, circle, curve or line.

7. The method of claim 1, wherein each of the plurality of one-dimensional gradient runs is a linear arrangement of pixels that form of a straight line along a direction parallel to rows or columns of the array of pixels.

8. The method of claim 1, wherein each of the plurality of one-dimensional gradient runs is a linear arrangement of pixels that form of a diagonal line with respect to a direction parallel to rows or columns of the array of pixels.

9. The method of claim 1, wherein each of the plurality of one-dimensional gradient runs corresponds in shape to an open curve.

10. The method of claim 1, wherein each of the plurality of one-dimensional gradient runs corresponds in shape to a closed curve.

11. The method of claim 1, wherein each of the plurality of one-dimensional gradient runs corresponds in shape to a polygon.

12. The method of claim 1, wherein the electronically acquired image corresponds to a color image represented by a two-dimensional array of red pixels, a two-dimensional array of green pixel, and a two-dimensional array of blue pixels,
step (a) further comprises identifying a plurality of one-dimensional gradient runs for the two-dimensional array of red pixels, a plurality of one-dimensional gradient runs for the two-dimensional array of green pixel, and a plurality of one-dimensional gradient runs for the two-dimensional array of blue pixels;
step (b) further comprises forming a second-order set of gradient runs by selecting a group of one-dimensional gradient runs identified in the two-dimensional array of red pixels, forming a second-order set of gradient runs by selecting a group of one-dimensional gradient runs identified in the two-dimensional array of green pixels, and forming a second-order set of gradient runs by selecting a group of one-dimensional gradient runs identified in the two-dimensional array of blue pixels; and
step (c) further comprises identifying the object in the array using the second-order sets of gradient runs associated with each of the two-dimensional array of red, green and blue pixels.

13. The method of claim 1, wherein step (c) comprises: identifying a secondary object in the array using the second-order set of gradient runs, and subsequently identifying a primary object of interest in the array based on a known spatial relationship between the secondary object and the primary object of interest.

14. A system for identifying an object in an electronically acquired image that includes at least one two-dimensional array of pixels, comprising a at least one processor that runs software which executes the following steps:
(a) identifying a plurality of one-dimensional gradient runs oriented along a common direction in the two-dimensional array of pixels; wherein each of the one-dimensional gradient runs includes three or more adjacent pixels ($P_1 \ldots P_k$) oriented along the common direction; wherein each of the one-dimensional gradient runs is defined by a common set of brightness trend parameters that include at least one brightness difference threshold (T) and a brightness difference direction parameter selected from the group comprising increasing brightness or decreasing brightness; wherein first and second adjacent pixels ($P_1, P_2$) along each one-dimensional gradient run have a brightness difference that is greater than the threshold (T) and a difference direction that matches at least one the brightness difference direction parameter of the one-dimensional gradient run; and wherein each subsequent pixel ($P_n$, n>1) after the first pixel ($P_1$) in each one-dimensional gradient run has a succeeding neighbor ($P_{n+1}$) oriented immediately after the pixel ($P_n$) along the common direction such that each adjacent pair of pixels ($P_n, P_{n+1}$, n>1) along each of the one-dimensional gradient runs has a difference that is unchanging or that matches the brightness difference direction parameter of the one-dimensional gradient run;
(b) forming a second-order set of gradient runs by selecting a group of one-dimensional gradient runs identified in step (a); wherein each of the one-dimensional gradient runs in the group has a pixel that is offset along an axis perpendicular to the common direction from a pixel in a neighboring one-dimensional gradient run in the group;

and wherein each of the one-dimensional gradient runs in the group has at least one pixel that is immediately adjacent to a pixel in another one-dimensional gradient run in the group; and (c) identifying the object in the array using the second-order set of gradient runs.

* * * * *